US010252688B2

(12) United States Patent
Szawarski et al.

(10) Patent No.: US 10,252,688 B2
(45) Date of Patent: Apr. 9, 2019

(54) MONITORING A VEHICLE CABIN

(71) Applicant: Ford Global Technologies, LLC, Dearborn, MI (US)

(72) Inventors: Hubert Szawarski, Waterford, MI (US); Jialiang Le, Canton, MI (US); Manoharprasad K. Rao, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 10 days.

(21) Appl. No.: 15/466,033

(22) Filed: Mar. 22, 2017

(65) Prior Publication Data

US 2018/0272977 A1 Sep. 27, 2018

(51) Int. Cl.
| | |
|---|---|
| *B60R 21/015* | (2006.01) |
| *B60N 2/02* | (2006.01) |
| *B60N 3/00* | (2006.01) |
| *G05D 1/00* | (2006.01) |
| *B60R 21/00* | (2006.01) |
| *B60R 21/01* | (2006.01) |

(52) U.S. Cl.
CPC ...... *B60R 21/01512* (2014.10); *B60N 2/0224* (2013.01); *B60R 21/01554* (2014.10); *B60N 3/001* (2013.01); *B60N 2002/0272* (2013.01); *B60R 2021/0032* (2013.01); *B60R 2021/01245* (2013.01); *B60R 2021/01286* (2013.01); *G05D 1/0088* (2013.01)

(58) Field of Classification Search
CPC ........ B60R 21/01512; B60R 21/01554; B60R 2021/01286; B60R 2021/01245; B60R 2021/0032; B60N 2/0224; B60N 2002/0272; B60N 3/001; G05D 1/0088
See application file for complete search history.

(56) References Cited

U.S. PATENT DOCUMENTS

| | | | |
|---|---|---|---|
| 9,409,461 B2 | 8/2016 | Wang et al. | |
| 2002/0140214 A1 | 10/2002 | Breed et al. | |
| 2009/0265063 A1 | 10/2009 | Kasugai et al. | |
| 2013/0344791 A1* | 12/2013 | Wang | B60H 1/00742 454/155 |
| 2014/0195096 A1 | 7/2014 | Schliep et al. | |
| 2014/0204211 A1 | 7/2014 | Gussen et al. | |
| 2014/0309806 A1* | 10/2014 | Ricci | B60Q 1/00 701/1 |

(Continued)

FOREIGN PATENT DOCUMENTS

| | | |
|---|---|---|
| DE | 102013011533 A1 | 1/2015 |
| EP | 2839997 A1 | 2/2015 |

(Continued)

OTHER PUBLICATIONS

GB Search Report dated Sep. 6, 2018 re GB Appl. 1804455.2.

*Primary Examiner* — Yuen H Wong
(74) *Attorney, Agent, or Firm* — Frank A. MacKenzie; Bejin Bieneman PLC

(57) ABSTRACT

A computer that includes memory that stores instructions executable by a processor. The computer may be programmed to: receive image data that includes a vehicle seat and an occupant within a vehicle cabin; determine, using the received data, an orientation of the seat and an orientation of the occupant; and perform a vehicle function based on the determination.

18 Claims, 6 Drawing Sheets

(56) References Cited

U.S. PATENT DOCUMENTS

| | | |
|---|---|---|
| 2015/0294169 A1 | 10/2015 | Zhou et al. |
| 2015/0331105 A1 | 11/2015 | Bell et al. |
| 2016/0180289 A1 | 6/2016 | Siris |

FOREIGN PATENT DOCUMENTS

| | | |
|---|---|---|
| JP | 2012224286 A | 11/2012 |
| WO | 199422693 A1 | 10/1994 |

* cited by examiner

Vehicle frontwardly

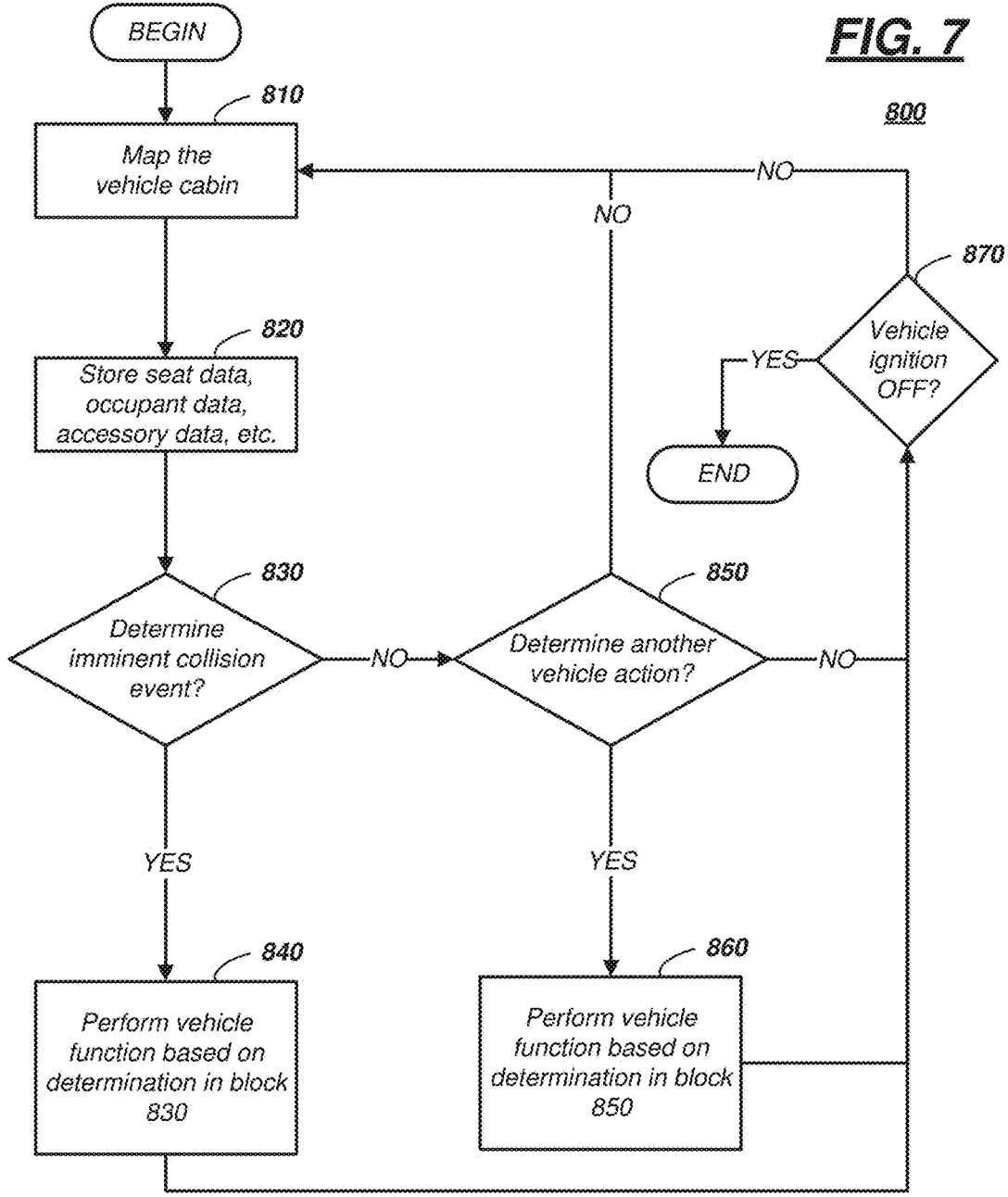

MONITORING A VEHICLE CABIN

BACKGROUND

Modern vehicles detect persons within a vehicle cabin using a variety of techniques. In some examples, the cabin has a digital camera or vehicle seat pressure sensor to detect a driver seated in the driver's seat.

BRIEF DESCRIPTION OF THE DRAWINGS

FIG. 7 is a flow diagram of a process of monitoring a vehicle cabin and performing a vehicle function based on the monitoring.

DETAILED DESCRIPTION

Figure 1:
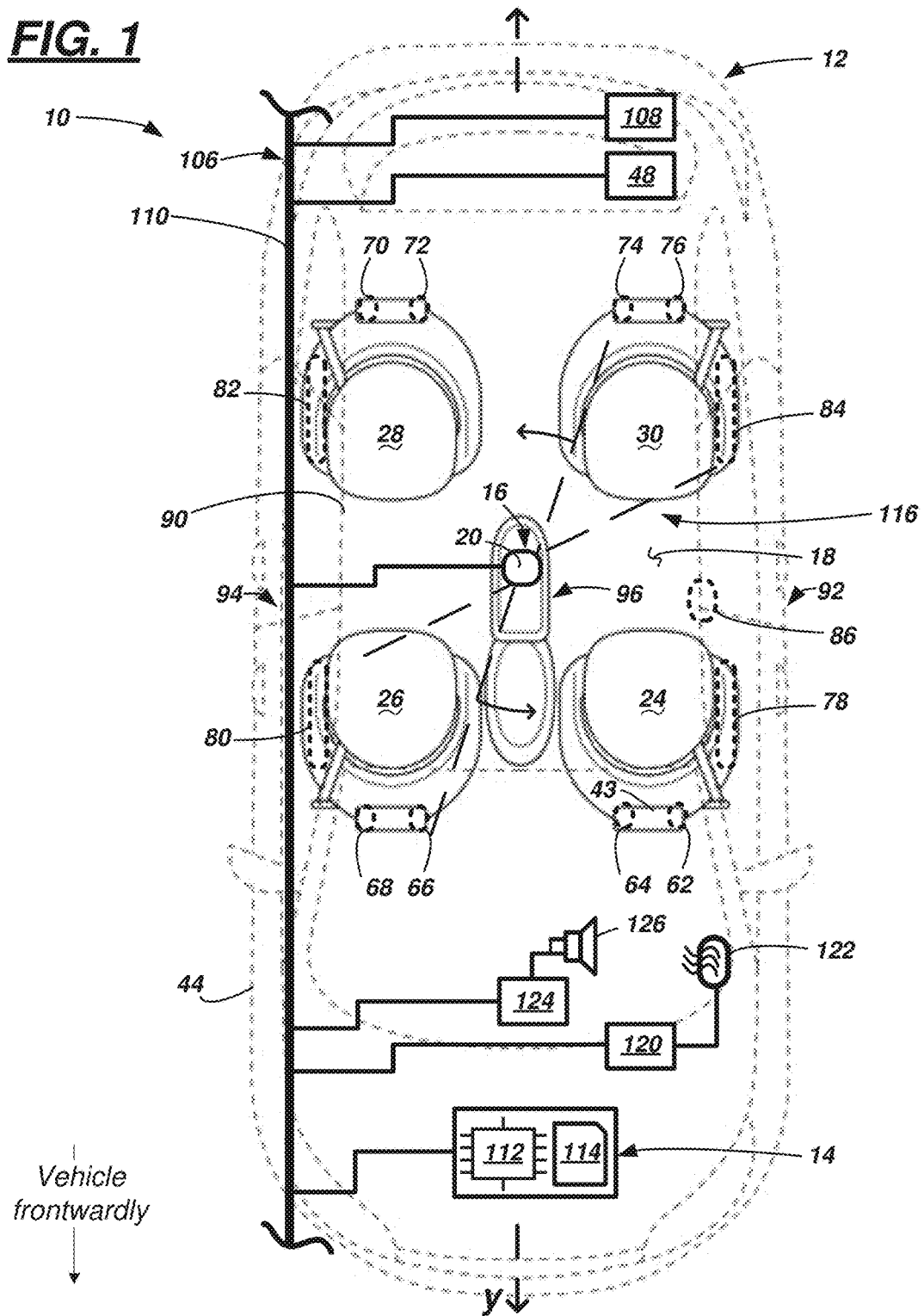
FIG. 1 is a schematic top view of a vehicle having a cabin monitoring system.

A cabin monitoring system for a vehicle is described. The system includes a computer that has memory that stores instructions executable by a processor to carry out, among other things, a process of monitoring a vehicle cabin.

According to one example, a computer is programmed to: receive image data that includes a vehicle seat and an occupant within a vehicle cabin; determine, using the received data, an orientation of the seat and an orientation of the occupant; and perform a vehicle function based on the determination.

According to the example, the data may be received from a sensor mounted within the vehicle cabin.

According to the example, the data may be received from at least one light detection and ranging device.

According to the example, the computer further may be programmed to, using the received data, determine a position of the vehicle seat, and then perform the function at least partially based on the position of the seat.

According to the example, the function may include inhibiting deployment of an airbag from a vehicle restraint module. Further, inhibiting deployment may be based on the orientation of the occupant relative to the seat.

According to the example, the function includes translating, reclining, rotating the seat, or a combination thereof.

According to the example, the function may include aligning an axis of the seat with a primary direction of force (PDOF) of a predicted collision event.

According to the example, the function may include controlling a directionality of an air vent or an audio speaker in the cabin.

According to another example, a computer is programmed to: determine, using sensor data, an orientation of a vehicle occupant relative to a vehicle seat; determine an imminent collision event; and control movement of the seat based on the determinations.

According to the example, the image data may be received from at least one light detection and ranging device located within a vehicle cabin.

According to the example, the computer further may be programmed to, based on the determinations, inhibit deployment of an airbag from a vehicle restraint module in response to the collision event.

According to the example, the movement includes translating, reclining, rotating the seat, or a combination thereof.

According to another example, a method includes: receiving image data that includes a vehicle seat and an occupant within a vehicle cabin; determining, using the received data, an orientation of the seat and an orientation of the occupant; and performing a vehicle function based on the determination.

According to the example, the data may be received from a sensor mounted within the vehicle cabin, wherein the data is received from at least one light detection and ranging device.

According to the example, the method further comprises: using the received data, determine a position of the vehicle seat, and then perform the function at least partially based on the position of the seat.

According to the example, the function may include, in response to a collision event, inhibiting deployment of a vehicle restraint module that includes an airbag. Further, inhibiting deployment may be based on the orientation of the occupant relative to the seat.

According to the example, the function includes translating, reclining, rotating the seat, or a combination thereof.

According to the example, the function may include aligning an axis of the seat with a primary direction of force (PDOF) of a predicted collision event.

With reference to the figures, wherein like numerals indicate like parts throughout the several views, there is shown a cabin monitoring system 10 for a vehicle 12. The system 10 includes an onboard computer 14 which receives sensor data from a sensor suite 16 located within an interior or cabin 18 of vehicle 12. Sensor suite 16 comprises one or more sensors 20 (e.g., light detection and ranging (LIDAR) devices) which map the positions and orientations of one or more vehicle seats 24, 26, 28, 30, any occupants ($O_1$, $O_2$, see FIG. 3), and other objects within the cabin 18. As will be described in greater detail below, cabin mapping may occur repeatedly so that computer 14 may perform one or more vehicle functions based on the mapping. For example, based on the sensor data, the computer 14 may provide an instruction to change an audio system directionality or to change a cabin heating (or cooling) directionality. In another example, based on the sensor data, computer 14 may provide an instruction to change a position and/or orientation of one of the seats 24-30. As will be explained more below, this may be in response to determining that an occupant is ingressing or egressing the vehicle 12, or it may be in response to predicting a collision event involving vehicle 12. These and other non-limiting vehicle function examples will be discussed more below.

Figure 2:
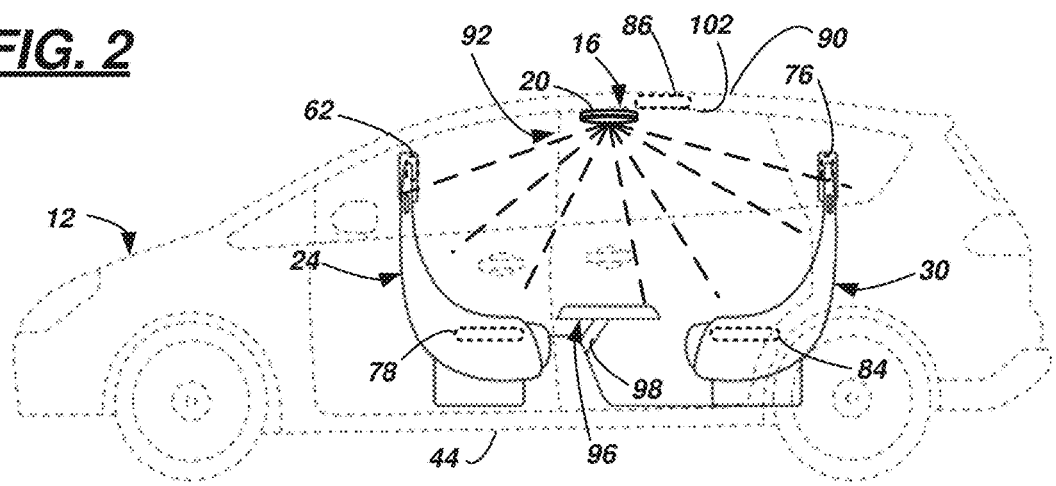
FIG. 2 is schematic side view of the vehicle shown in FIG. 1.

Referring to FIGS. 1-2, the vehicle 12 is shown as a passenger car; however, vehicle 12 also could be a truck, sports utility vehicle (SUV), recreational vehicle, bus, train, marine vessel, aircraft, or the like that includes the cabin monitoring system 10. Vehicle 12 may be operated in any one of a number of autonomous modes. In at least one example, vehicle 12 may operate in a fully autonomous mode (e.g., a level 5), as defined by the Society of Automotive Engineers (SAE) (which has defined operation at levels 0-5). For instance, in the non-limiting example shown in FIG. 1, the vehicle 12 does not include a steering wheel as one or more computers operate the vehicle 12; this is merely an example (e.g., in other implementations, vehicle 12 may be operated, at least in part, by a vehicle user or occupant). With respect to the SAE defined levels, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

Vehicle 12 is shown having four seats 24-30 within the cabin 18 (FIGS. 1-4). As used herein, the cabin 18 includes a region adapted to carry at least human occupants and includes at least one vehicle occupant restraint (e.g., such as a seat belt, a deployable airbag, etc.). While four seats 24-30 are shown, more or fewer seats may be used in other examples. While not required, each seat 24-30 may be identical in some examples; therefore, only one seat (24) will be described in detail for purposes of illustration.

Figure 5:
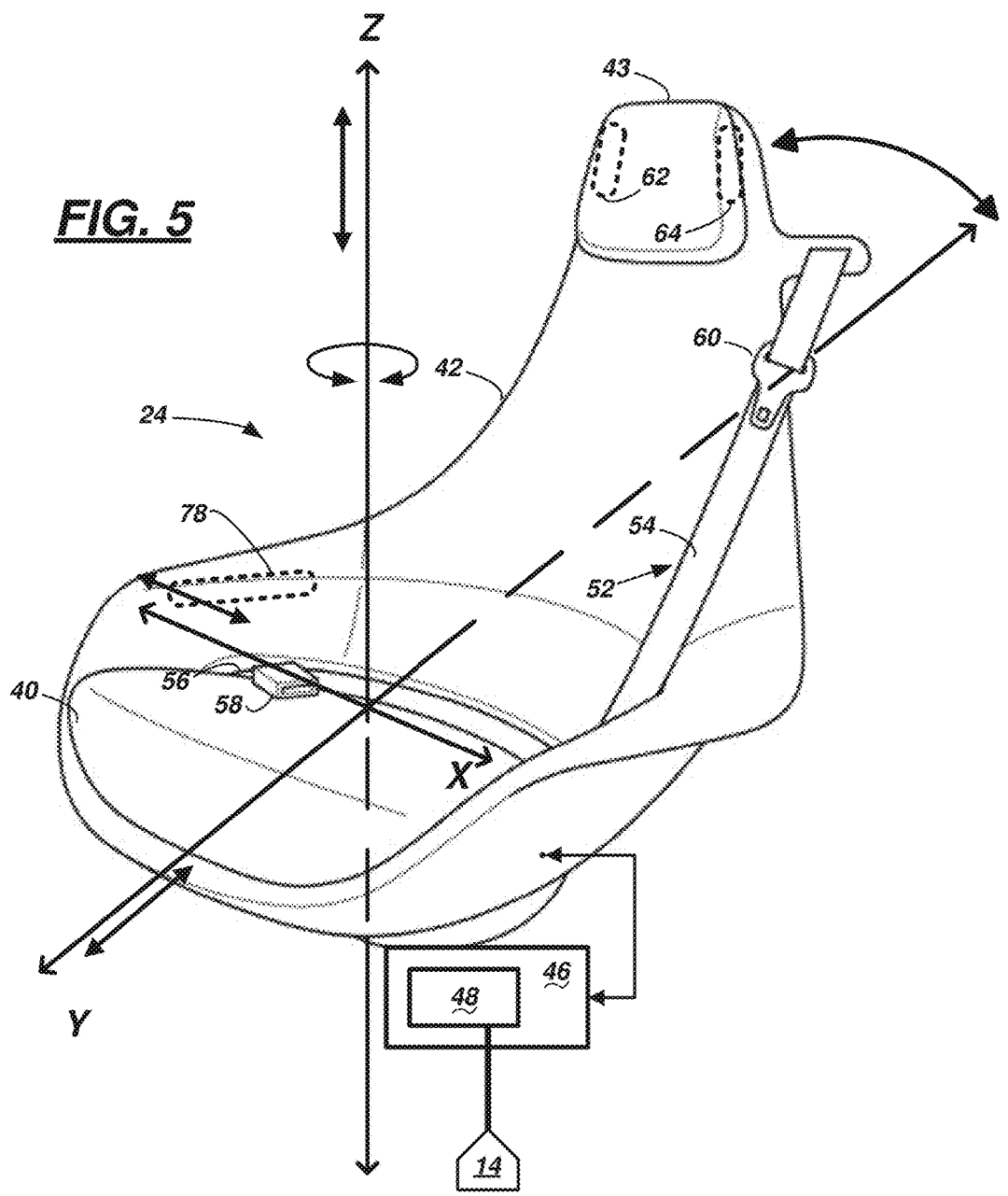
FIG. 5 is a perspective view of one of the vehicle seats.

As best shown in FIG. 5, seat 24 includes a seat base 40 having a recline-able seat back 42. The seat 24 is illustrated as a bucket seat having a headrest 43; however, this is merely an example and other seat configurations are also possible. The base 40 may be coupled to a vehicle body 44 (shown in FIG. 1) via a mount 46 (schematically illustrated). Herein, the vehicle body 44 may support the vehicle 12—and may have any suitable construction, including but not limited to various unibody constructions or body-on-frame constructions.

The mount 46 may include a controller 48 (schematically illustrated) that includes one or more motors and the like to facilitate powered movement of the vehicle seat 24 in a number of directions and/or orientations. Non-limiting examples of directions and/or orientations, relative to the vehicle body 44, include: moving the base 40 and back 42 in a vehicle-fore direction (e.g., along illustrated axis Y, which may be parallel to a longitudinal y-axis of vehicle 12 as shown in FIG. 1), moving the base 40 and back 42 in a vehicle-aft direction (e.g., along illustrated axis Y), moving the base 40 and back 42 in a vehicle-port direction (e.g., along illustrated axis X, which may be transverse and/or perpendicular to the vehicle y-axis), moving the base 40 and back 42 in a vehicle-starboard direction (e.g., along illustrated axis X), moving the base 40 and back 42 in a vehicle-upward direction (e.g., along illustrated axis Z, which may be perpendicular to the X and Y axes), moving the base 40 and back 42 in a vehicle-downward direction (e.g., along illustrated axis Z), and moving the base 40 and back 42 in a rotational direction (e.g., with respect to illustrated axis Z). Further, in each of these positions and/or orientations, the seat back 42 may be in a plurality of reclined positions (e.g., ranging from a perpendicular orientation with respect to seat base 40 (e.g., an upright position) to parallel with respect to base 40 (e.g., a fully reclined position)). It should be appreciated that axis Y can be parallel to the y-axis (and that axis X can be transverse thereto) when the seat 24 is in a nominal or first position; and for example, when the seat 24 is rotated by the occupant to a second position, the Y- and y-axes may not be parallel, or when the occupants moves the seat 24 to the second position, the seat 24 may be shifted in X- and/or Y-directions without rotation (about the Z-axis). As will be described more below, in at least some examples, computer 14 instructs or otherwise controls controller 48 to move seat 24 from the first or second position when a collision event is predicted—e.g., rotating and/or repositioning the seat 24 to an impact position—e.g., so that the respective seat's Y-axis is parallel to a primary direction of force (PDOF) of an imminent impact. In this manner, rotational forces of the impact may be minimized on the occupant.

The controller 48 may communicate with computer 14—e.g., so that computer 14 may control movements (e.g. position and/or orientation) of the seat base 40, the seat back 42, or a combination thereof with respect to axes X, Y, Z. Of course, manually-operable controls (not shown) may be available on or near seat 24 as well—e.g., enabling an occupant to move or re-orient seat 24 as desired.

Seat 24 further may include a seatbelt restraint 52 that includes seatbelt webbings 54, 56, a seatbelt buckle 58, and a seatbelt clip 60—the buckle 58 and clip 60 being couple-able to another to restrain a vehicle occupant (e.g., $O_1$, $O_2$) via the webbings 54, 56, as known in the art. Further, as described more below, the restraint 52 may be coupled to the controller 48—e.g., enabling computer 14 and the controller 48 to execute one or more collision event counter-measures such as detecting whether the buckle 58 and clip 60 are in a coupled state, retracting of seatbelt webbing 54 and/or 56 to tighten the webbing around the seated occupant prior to and/or during a collision event, or the like.

Figure 3:
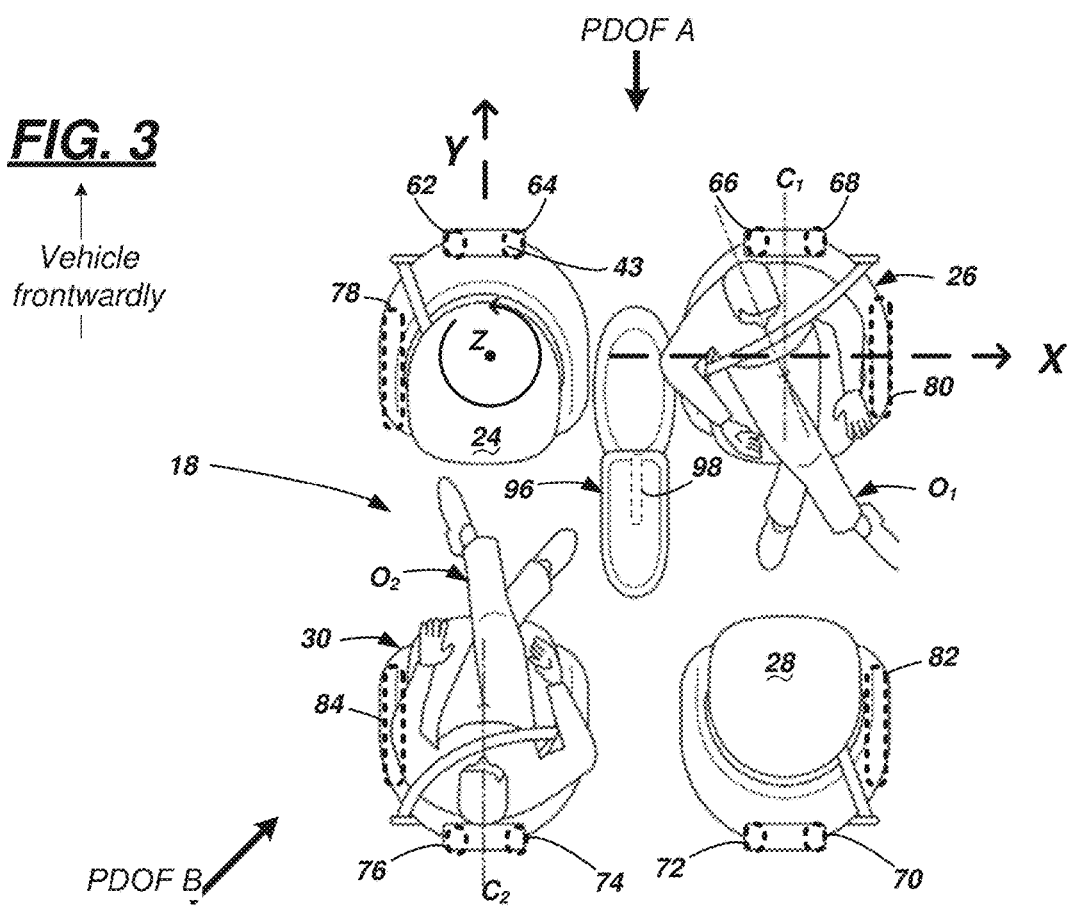
FIG. 3 is a top view of the vehicle seats shown in FIG. 1, each of two vehicle seats containing an occupant.

Referring to FIGS. 1-3, with respect to at least some of the vehicle seats 24-30, vehicle 12 further may include one or more vehicle restraint modules 62, 64, 66, 68, 70, 72, 74, 76, 78, 80, 82, 84, 86. Each module 62-86 may include, among other things, a housing (not shown), an inflator (not shown), and an airbag (not shown) so that, during a collision event, an impact sensor (not shown) may detect an impact and transmit a trigger signal causing the inflator to inflate the airbag which then deploys outwardly from the housing to restrain vehicle occupant(s), as is known in the art.

In at least the illustrated example, two of each module 62-76 may located on opposite sides of the respective headrests of vehicle seats 24-30 (e.g., seat 24 includes modules 62-64 located on opposite sides of the headrest 43); any of the modules 62-76 may be selectively deployed on either side of an occupant's head and/or upper torso. In the illustrated example, modules 78-84 are located in the vehicle seats 24-30, respectively, and module 86 (e.g., a deployable curtain airbag) is located in vehicle roof 90. Curtain airbag module 86 can be arranged to cover all occupants within seats 24-30. Or in another example, the airbag of module 86 can cover the side windows area proximate to occupants seated in seats 24, 30 and/or the area between occupants seated in seats 24, 30. Still further, other such curtain modules can be located elsewhere within the vehicle and be designed to deploy about occupants in any suitable position and/or orientation therein. Similarly, these modules 78-86 may be selectively deployed based on the location of an occupant's torso and/or lower body—as well as based on a primary direction of force (PDOF) of an impact. These and other restraint module implementations are merely examples—other examples are possible. Thus, continuing with the example of vehicle seat 24, airbag modules 62, 64, 78 are shown located relative to that seat 24—and can be selectively deployable to restrain an occupant located therein.

Figure 4:
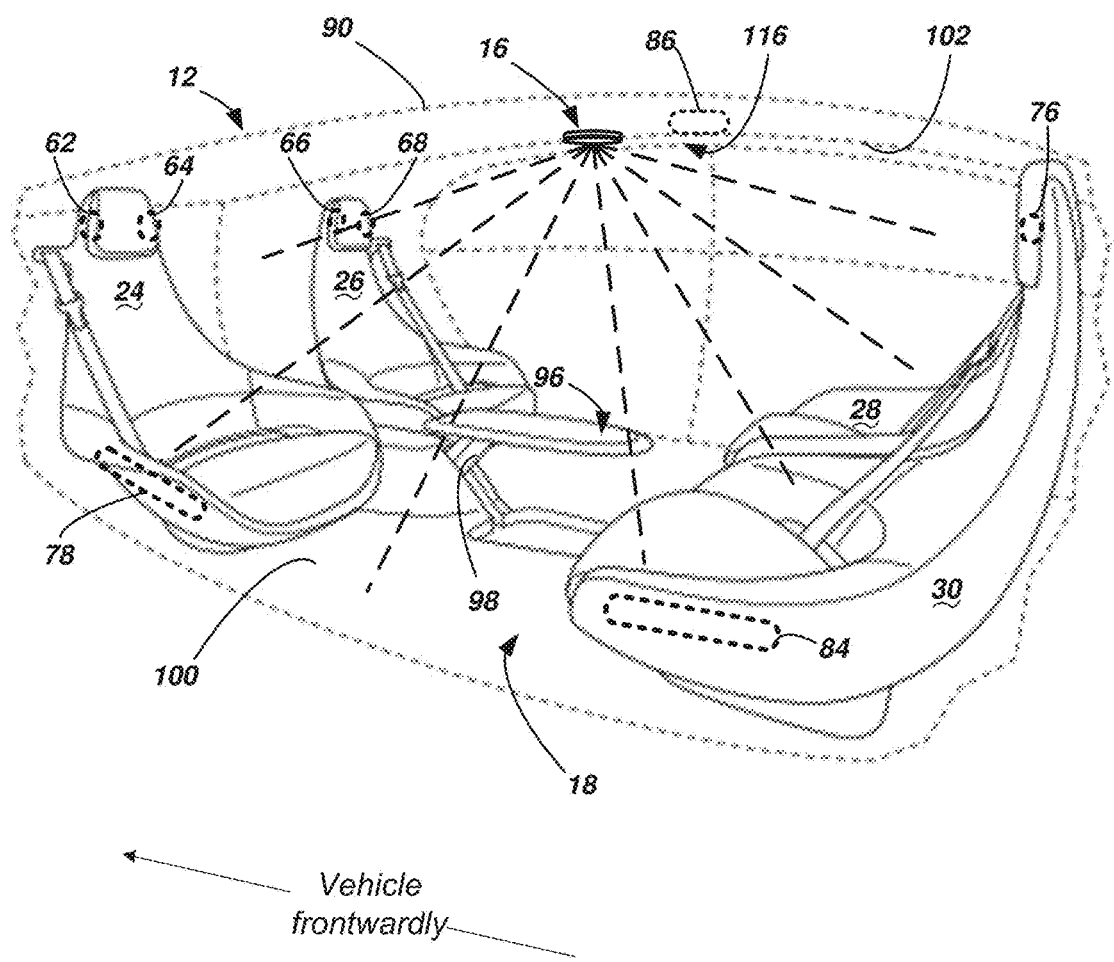
FIG. 4 is a perspective view of a cabin of the vehicle shown in FIG. 1.

In at least one example, seats 24-30 within the cabin 18 may be arranged as a conference center. For example, seats 24-26 may face generally vehicle-rearwardly and seats 28-30 may face generally vehicle-frontwardly (e.g., facing seats 24-26). Further, the cabin 18 may have one or more electronically-stowable accessories 96 to facilitate a conference-type meeting, such as the illustrated table, which is best shown in FIG. 4. For example, the table may be centrally located with respect to a rectangular arrangement of vehicle seats 24-30, and may be configured with an electronically movable arm 98 which can be controlled by computer 14. For example, by controlling the arm 98, the table may be electrically powered between a stowed position (e.g., flat against or within a floor 100 of the vehicle cabin 18) and a deployed position (e.g., extending upwardly from the floor 100). As will be described more below, in at least some examples, computer 14 instructs or otherwise controls one or more accessories 96 (e.g., like the table) from the deployed position to the stowed position in order to protect the occupants when a collision event is predicted. In this manner, the computer 14 may minimize the likelihood of accessories 96 such as the table detaching from the vehicle 12 and becoming projectiles within the cabin 18 during a collision (or e.g., unbelted occupants hitting the table during impact).

Thus, the table is merely one example of an accessory 96. Other non-limiting examples include a monitor or display which may be similarly electrically powered from deployed position to a stowed position (e.g., from a surface 102 of the vehicle roof 90, from the floor 100, from one of roof pillars 92, 94, or the like).

Returning to FIG. 1, a vehicle communication network 106 is also schematically illustrated. The network 106 communicatively couples computer 14, sensor suit 16, controller 48 (described above), and a collision avoidance system 108 to one another via a wired or wireless network connection 110 or any other suitable communication architecture. In at least one example, the connection 110 includes one or more of a controller area network (CAN) bus, Ethernet, Local Interconnect Network (LIN), a fiber optic connection, or the like. Other examples also exist. For example, alternatively or in combination with e.g., a CAN bus, connection 110 could comprise one or more discrete wired or wireless connections.

Computer 14 may be a single computer (or multiple computing devices—e.g., shared with other vehicle systems and/or subsystems). In at least one example, computer 14 can be a so-called restraint control computer; however, this is merely an example. Computer 14 may comprise a processor or processing circuit 112 coupled to memory 114. For example, processor 112 can be any type of device capable of processing electronic instructions, non-limiting examples including a microprocessor, a microcontroller or controller, an application specific integrated circuit (ASIC), etc.—just to name a few. In general, computer 14 may be programmed to execute digitally-stored instructions, which may be stored in memory 114, which enable the computer 14, among other things: to receive sensor data associated with objects within vehicle cabin 18 (seats 24-30, occupants $O_1$, $O_2$, accessories 96, etc.); using the sensor data, determine a position and/or orientation of at least one of the vehicle seats 24-30; determine a position and/or orientation of at least one occupant $O_1$, $O_2$; determine a position and/or orientation of at least one accessory 96; calculate relative distances between occupants, seats, and other vehicle structures and accessories, etc.; and/or perform a vehicle function based on one or more of these determinations. All the positions may be absolute from which relative positions between the occupant and seat, seat and vehicle structure, occupant and accessories, etc. can be calculated.

Memory 114 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 114 may store one or more computer program products which may be embodied as software, firmware, or the like.

Sensor suite 16 can comprise one or more sensors 20 positioned in the cabin 18 of vehicle 12 to scan, image and/or collect data regarding objects therein. This data then can be used by the sensor suite 16 (and/or computer 14) to map the interior of the cabin 18—e.g., including mapping objects (e.g., such as seats 24-30, accessories 96, and occupants $O_1$, $O_2$). Sensors 20 may be positioned in any suitable location within the cabin 18; however, in at least one example, the sensor(s) 20 are located in the roof 90—e.g., oriented downwardly from surface 102 (e.g., as shown in FIG. 4) and is capable of scanning 360 degrees of cabin interior 18 Non-limiting examples of sensor(s) 20 may include one or more of light detection and ranging (LIDAR) devices, radio detection and ranging (RADAR) devices, sonar devices, day cameras (e.g., complementary metal oxide semiconductor (CMOS) devices, charge-coupled devices (CCDs), image intensifiers (so-called i-squared devices)), etc. Singly or collectively, data from sensors 20 may be used by computer 14 to create a visual map along with range information for each detection. In at least one example, sensor(s) 20 include LIDAR devices which provide sensor data to computer 14 (e.g., which includes information pertaining to shape and size of detected objects, as well as the spatial relationships therebetween). Thus, in at least some examples, sensor suite 16 and/or computer 14 may reconstruct a three-dimensional (3D) model of at least a portion of the cabin 18 and objects located therein, and computer 14 may use this model to determine whether to execute vehicle functions, as described more below.

Sensor(s) 20 which use LIDAR may employ an active scanning technique which includes emitting light signal (from an emitter, not shown) and measuring a so-called 'return' (at a detector, not shown)—the return comprising a reflectance of the emitted signal. Each sensor 20 may have multiple emitter/detector pairs. Collectively, these pairs may be configured to scan their surroundings between 0° and 360°. As LIDAR techniques and LIDAR devices are generally known in the art, their implementation will not be discussed further herein.

FIG. 1 illustrates an example of vehicle 12 utilizing a single sensor 20 (e.g., having LIDAR technology) to scan and collect data within cabin 18. In this example, sensor 20 is located on and/or at least partially within the roof 90 of vehicle 12—e.g., within in a central region 116 thereof, with respect to seats 24-30. In this manner, by scanning 360°, one sensor 20 may provide image data that can be used to map the size, shape, position, and/or orientation of vehicle seats 24-30, of occupants $O_1$, $O_2$ and of accessories 96. The sensor 20 can include one light beam or multiple light beams in vertical arrangement (about a vertical axis) rotating around the cabin's interior 18.

Figure 6:
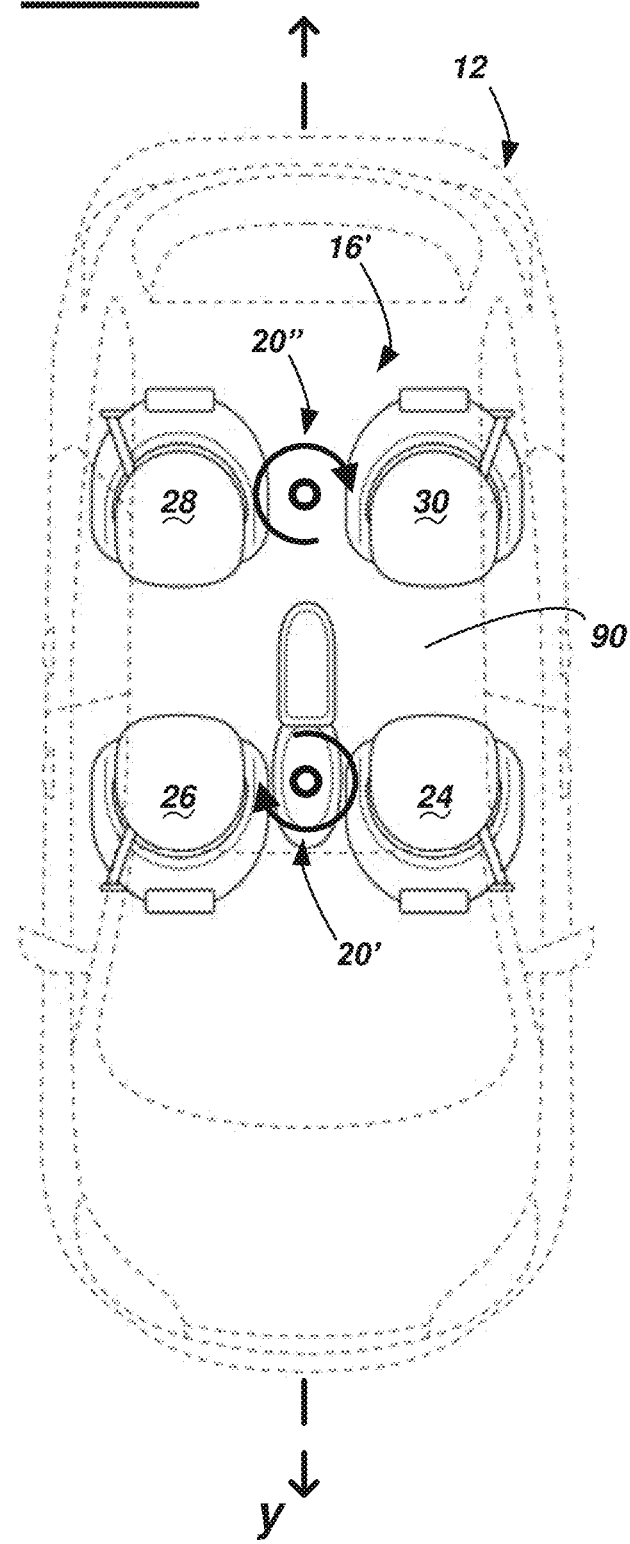
FIG. 6 illustrates an additional example of a sensor suite of the vehicle shown in FIG. 1.

Other sensor arrangements are also possible, including arrangements having more than one sensor 20. For example, FIG. 6 illustrates a sensor suite 16' having a two-sensor (20', 20") arrangement. Sensors 20', 20" can be arranged along the vehicle's y-axis (e.g., carried by the roof 90) or according to any other suitable arrangement (e.g., at opposite corners of cabin 18, at opposite vehicle pillars, etc.). Other examples also exist.

Returning again to FIG. 1, collision avoidance system 108 is intended to include one or more vehicle sensors and at least one computer configured to receive data from these sensor(s) and determine or predict a collision event. The sensor(s) may include imaging and/or scanning devices having a field of view that captures any suitable region located outside of the vehicle 12 (e.g., the roadway, lane markers, signage, other vehicles, pedestrians, etc.). And the computer(s) associated with system 108 could include computer 14, one or more dedicated computing devices, a system of interconnected computing devices programmed to execute software to assist the vehicle 12, or the like. Thus, for example, when vehicle 12 operates in any autonomous mode—including a fully autonomous mode—the collision avoidance system 108 can help to avoid a collision event or minimize the damage, impact, severity, etc. that occurs as a result of a collision event. Thus, in at least some instances, system 108 also may provide instructions to other vehicle systems and/or subsystems—e.g., such as software instructions to a vehicle steering system, software instructions to a vehicle braking system, software instructions to a vehicle powertrain system, software instructions to a vehicle restraint system (e.g., tightening seatbelt restraints, deploying airbags from restraint modules, etc.), or the like. Operation of the collision avoidance system 108—e.g., acting in concert with the execution of instructions stored in computer 14—also can include: inhibiting the deployment of an airbag from one of the modules 62-86, moving and/or orienting a vehicle seat 24-30 towards an impact position, stowing one or more vehicle accessories 96, or the like, as will be discussed in greater detail below.

Vehicle 12 may comprise a variety of other vehicle computing systems as well. For example, vehicle 12 may have a climate control system 120 for heating and/or cooling the cabin 18 of vehicle 12. For example, the system may include any suitable number of computing devices (not shown) and a plurality of directional forced-air vents 122 (only one is shown for illustration purposes) which may be electronically controlled to alter the amount of forced air, as well as their directionality—e.g., in response to an instruction provided by computer 14, as will be described more below.

The vehicle 12 also may comprise an entertainment system 124 that includes any suitable computing device (not shown), a human-machine interface (HMI) coupled to the computing device such as a so-called vehicle head unit (not shown), and a plurality of audio speakers 126 coupled thereto (only one is shown for illustration purposes). The audio directionality of speakers 126 may be controlled by the system 124 to provide a surround-sound experience for occupants $O_1$, $O_2$ of the vehicle cabin 18—e.g., in response to an instruction provided by computer 14, as will be described more below.

Turning now to FIG. 7, a process 800 of monitoring the vehicle cabin 18 and performing a vehicle function based on the monitoring is shown. The process begins with block 810 wherein the sensor suite 16 maps the vehicle cabin 18. Cabin mapping may include obtaining sensor data (e.g., image data) from at least one sensor 20 (e.g., at least one LIDAR device) and then forming one or more three-dimensional (3D) images or models using that image data. For purposes of illustration only, the remainder of the process 800 will be described with respect to computer 14 determining a 3D model of the cabin 18 from image data.

For example, as shown in FIG. 1, sensor 20 may scan 360° from its central region 116 capturing image data and providing it to the computer 14 via network connection 110 so that computer 14 may form the 3D model. In other LIDAR arrangements, sensors could scan less than 360° in order to obtain the image data of cabin 18. For example, for seating positions such as those shown in FIG. 6, sensor 20' could scan a cabin region that includes seats 26, 28, while sensor 20" could scan a cabin region that includes seats 24, 30. Of course, this is merely a non-limiting example; other examples are also possible.

As will be appreciated by skilled artisans, rotation during scanning of the respective sensor(s) may include electronic rotation or electro-mechanical rotation or the like—e.g., in the example shown in FIG. 1, sensor 20 may obtain a set of image data of the cabin 18 with each full rotation)(360° (e.g., wherein speed rotation can vary based on field of view and field of regard). Further, such scanning may be continuous, periodic, or intermittent. In at least one example, block 810 occurs repeatedly throughout the process 800 so that the cabin 18 is scanned repeatedly at any suitable frequency; thus, block 810 may occur during other blocks discussed below. In this manner, computer 14 may determine to execute certain vehicle functions based on updated cabin information, as described more below.

Computer 14 may store in memory 114 and execute, using processor 112, a reconstruction algorithm so that computer 14 may map the cabin 18 and its contents using the image data received from sensor(s) 20. Mapping algorithms, techniques for employing them, and the like are known and therefore will not be discussed further here. It will be appreciated that using such mapping algorithm(s), computer 14 may form a model of the position and orientation of the occupants $O_1$, $O_2$, of the position and orientation of the vehicle seats 24-30, whether accessories 96 are in a stowed or deployed position, and the like.

To illustrate, computer 14 may construct a 3D model using image data that provides information concerning seat position and orientation, occupant position and orientation, accessory position and/or orientation—e.g., positions, distances, and orientations all relative to one another and/or other vehicle structure (e.g., including surfaces of vehicle doors, surfaces of a vehicle headliner, vehicle floor surfaces, console surfaces, etc.).

Thus, FIG. 3 illustrates a one non-limiting example of vehicle seats 24-30 and two occupants $O_1$, $O_2$. Here, for example, computer 14 may construct a 3D model that indicates that each of vehicle seats 24-30 are in the nominal position, that occupant $O_1$ is seated in vehicle seat 26, that occupant $O_2$ is seated in vehicle seat 30, and that the accessory 96 (the table) is in a deployed position. In other examples, one or more of the seats 24-30 may be at least partially rotated. As each seat 24-30 may be in the nominal position, only one (seat 26) will be explained in detail for illustrative purposes. For example, in FIG. 3, seat 26 is not shown translated along any of the X-, Y-, or Z-axes from its central, nominal position (thus, using the 3D model generated by computer 14, seat position is determinable (e.g., by comparing the generated 3D model with a reference image(s) or a reference model stored in memory 114 of the seat 26 in the nominal position)). In addition, seat 26 is not rotated from its nominal (rearward-facing position) about the Z-axis (thus, using the 3D model, seat orientation is determinable using similar reference image(s) or models). Seat orientation also may include whether the seat back 42 is declined in any degree from a nominal fully upright position—with respect to the seat base 40. In FIG. 3, the respective seat back 42 is in the fully upright (nominal) position. Thus, as used herein, seat position pertains to whether the respective seat is translated in any of the X-, Y-, or Z-directions (e.g., from a nominal position) and, as used herein, seat orientation pertains to whether the respective seat is rotated about the Z-axis (e.g., from a nominal facing direction) and also pertains to the angle of the seat back relative to the respective seat base.

With respect to the occupants $O_1$, $O_2$, the 3D model can indicate their occupants' position as well as their orientation. As used herein, occupant position pertains to whether an occupant is located in one of vehicle seats 24-30 (or not). Thus, in FIG. 3, the position of occupant $O_1$ is seated in vehicle seat 26, and the position of occupant $O_2$ is seated in vehicle seat 30. As used herein, occupant orientation pertains to the manner in which an occupant is positioned relative to the vehicle seat. To illustrate, occupant $O_2$ is oriented in a nominal position. More particularly, as vehicle seat 30 (in the nominal position) faces vehicle frontwardly, so does occupant $O_2$. For example, the occupant's shoulders are squared to the seat back 42 and a center plane $C_2$ of the occupant's body includes the Y-axis of the respective seat 30. Further, as the seat 30 is in the fully upright position, so is the occupant $O_2$. As used herein, a center plane is a sagittal plane running through at least the head and torso of the occupant. Further, an occupant's center plane may be considered to be aligned with (or be considered to include the Y-axis of the respective seat) provided it is within a predetermined threshold thereof. Further, computer 14 may be programmed to determine whether the occupant is in the nominal orientation or to what degree the occupant is not in the nominal orientation.

Consider also occupant $O_1$ who is not in a nominal orientation. For example, the occupant $O_1$ does not have both shoulders squarely against the respective seat back 42; further, a center plane $C_1$ of the occupant's body is not parallel to the Y-axis of the respective vehicle seat 26 (e.g., plane $C_1$ and the respective Y-axis of seat 26 have an angular difference greater than a threshold).

As an occupant may move or position his/her body in virtually innumerable positions, many other examples of orientation exist. For instance, occupant orientation can include whether any part of the occupant's body is extended outside of the cabin 18 (e.g., hanging hands, arms, legs, etc. out of a vehicle window), whether the occupant is upright in a vehicle seat that is partially or fully reclined (e.g., the occupant's shoulders are not against the seat back), whether the occupant's legs are folded or bent upwardly or to the side while the respective seat is in a reclined position (e.g., including a fully reclined position), just to name a few non-limiting examples.

With respect to accessories 96, the 3D model determined by computer 14 may indicate whether the table or other accessory (e.g., monitor, etc.) is in a stowed position or in an at least partially deployed position (i.e., any position which is not the stowed position).

In at least one example, in block 820 of process 800 (which can follow block 810), the computer 14 stores one or more data types—e.g., including but not limited to seat data, occupant data, and/or accessory data. As used herein, seat data includes any data pertaining to the position and orientation of at least one of the vehicle seats 24-30. In some examples, seat data may pertain to all vehicle seats 24-30; in other examples, seat data pertains only to those seats that are occupied by one of the vehicle occupants (e.g., $O_1$, $O_2$). As used herein, occupant data includes any data pertaining to the position and/or orientation of the occupants (e.g., $O_1$, $O_2$). And as used herein, accessory data includes any data pertaining to accessories or to accessories which are in the deployed position (or at least partially deployed position). Computer 14 may store one or more of these data types in memory 114 for any suitable duration. In one example, the computer 14 deletes or overwrites the data types following each successive mapping of the vehicle cabin 18 (e.g., block 810). In another example, computer 14 deletes or overwrites the data types after a threshold period of time (e.g., after 3-5 minutes)—e.g., storing several minutes of the most-recently scanned image data in case a collision event takes place. If a collision event occurs, the computer 14 stores the data types until an authorized service technician performs a download of memory 114. In this manner, collision event information may be preserved for accident investigation or continuous-improvement engineering purposes.

In block 830 which follows, computer 14 determines whether an imminent collision event is predicted or about to occur. As used herein, imminent means about to occur or having a likelihood that the event will occur, wherein the likelihood is a statistical probability (calculatable by computer 14) which is greater than a threshold. In one example, the threshold may be 80%; in another example, the threshold is 90%; in yet another example, the threshold is 95%.

In at least one example, processor 112 of computer 14 determines whether the collision avoidance system 108 has provided it any indication or prediction of a collision or potential collision. The collision avoidance system 108, as described above, may sense or determine collision event in a number of ways—including but not limited to the use of traction control data, forward-roadway LIDAR data or any proximity sensing data, forward-roadway camera data, vehicle-to-vehicle (V2V) communication of a collision ahead, braking data (e.g., from surrounding vehicles), etc., just to name a few examples. Thus, system 108 can provide an instruction in any suitable form to computer 14 via network connection 110 when the computing devices of system 108 determine an imminent collision event. In block 830, system 108 may execute any suitable collision detection technique(s) known to skilled artisans and provide any suitable indication or instruction to computer 14.

In at least one example, when collision avoidance system 108 provides computer 14 with an indication of an imminent collision event, it also provides collision data. In at least one non-limiting example, collision data can include a predicted impact direction (e.g., a primary direction of force (PDOF)), a predicted impact magnitude, or both.

If in block 830 computer 14 determines an imminent collision event, process 800 proceeds to block 840; however, if computer 14 does not determine an imminent collision event, the process may proceed to block 850.

In block 840, computer 14 may perform one or more vehicle functions in response to the determination of block 830. For example, computer 14 may take certain collision countermeasures to protect the vehicle 12, the vehicle occupants $O_1$, $O_2$, etc. In one example, the computer 14 uses the 3D model (generated in block 810) and/or the stored seat data, occupant data, and/or accessory data (block 820) to perform the vehicle function in block 840. A number of non-limiting illustrations follow.

In one example, computer 14 determines to deploy certain of the vehicle restraint modules 62-86, but not others. For example, in accordance with the occupant arrangement shown in FIG. 3 (wherein a PDOF A provided by the collision avoidance system 108 indicates a head-on collision), computer 14 may cause restraint modules 66, 74, 76, 80, 84 to deploy and inhibit restraint module 68 from deploying. Airbag of module 66, when deployed in a controlled manner, may help reduce the occupant $O_1$ neck whiplash injuries, and there may not be a need to deploy airbag of module 68 as there may be no possibility of contact between the occupant $O_1$ and module 68 airbag.

Other similar examples exist. For example, computer 14 may inhibit deployment of one or more restraint modules when individuals are not seated in corresponding vehicle seats 24-30. Or the computer 14 may inhibit any restraint module deployment based on an assessment by computer 14 that the deployment itself is likely to cause injury to the occupant.

In another example, the computer 14 may move one or more of the vehicle seats 24-30 based on the determination of imminent collision (e.g., based on the instruction from the collision avoidance system 108). Again, computer 14 may control vehicle seat movement using controller 48—thereby causing the respective seat to translate along the X-, Y-, or even Z-axes and/or rotate about the Z-axis. As shown in FIG. 3, if the imminent collision is coming from PDOF B, then for example, computer 14 may rotate and/or translate vehicle seat 30 clockwise so as to align the seat 30 and occupant $O_2$ with the PDOF B so that rotational forces during the collision are minimized on the occupant's body. Thus, in one example, computer 14 may align center plane $C_2$ with PDOF B (or make parallel thereto).

Computer 14 also could rotate and/or translate seat 26 so that occupant $O_1$ is best suited for an impact having PDOF B. Furthermore, in this example, rotating vehicle seat 26 may cause an interference between the accessory 96 and occupant $O_1$ (e.g., his/her legs). Thus, prior to this movement of seat 26, computer 14 may cause accessory 96 to move toward (or into) the stowed position—moving the table into the floor 100—e.g., by controlling it electronically. In this manner, computer 14 may take countermeasures that places both occupants $O_1$ and $O_2$ in the best position and/or orientation during the collision event.

Following block 840, process 800 may proceed to block 870 to determine whether the vehicle ignition state is OFF. If the state is OFF, process 800 ends. If the vehicle ignition state is ON, then process 800 loops back and repeats at least part of the process beginning again with block 810.

Returning to block 850, which follows block 830 when no imminent collision event is determined, computer 14 may determine whether to perform another vehicle function—e.g., a non-emergency vehicle function. For example, if the occupants $O_1$, $O_2$ are using a vehicle entertainment system, computer 14 may determine that adjusting vehicle audio is desirable. Or for example, if the occupants $O_1$, $O_2$ are using a vehicle climate control system, computer 14 may determine that adjusting temperature and/or air flow is desirable. If such a determination is made, the process 800 proceeds to block 860; otherwise, the process may proceed to block 870 which was described above (or alternatively loop back to block 830).

In block 860, computer 14 may perform an appropriate vehicle function based on mapping the vehicle cabin 18 (block 810), based on stored seat, occupant, or accessory data (block 820), and/or based on the determination in block 850. Thus, in one example, computer 14 may control a directionality of one or more air vents 122 to direct air toward vehicle seats 26 and 30 occupied by occupants $O_1$, $O_2$. Or the computer 14 may control a directionality of one or more audio speakers 126 to adjust surround sound based on the position and orientation of occupants $O_1$, $O_2$. These are merely examples of non-emergency vehicle functions which computer 14 may execute in block 860; others exist. Following block 860, process 800 proceeds to block 870 described above. Alternatively, computer 14 may loop back and repeat block 830, re-determining whether a collision event is imminent.

Other examples of process 800 exist as well. For instance, in at least one example, computer 14 further determines whether the seat buckle 58 and clip 60 are in a coupled state (e.g., using the image data and/or electronic data from controller 48). And in at least one example, computer 14 performs the vehicle function in block 840 only when the buckle 58 and clip 60 are in the coupled state. For example, it is anticipated that a rapid rotation of a vehicle seat in preparation for impact (e.g., via PDOF A, PDOF B, etc.) could displace an occupant whose seat buckle is in the uncoupled state from the vehicle seat and potentially cause more harm; thus, in at least some instances, computer 14 bases a determination to perform a vehicle function at least partially on the coupled or uncoupled state of the seat buckle 58 and clip 60.

It should be appreciated that computer 14 may control other vehicle components as well. For example, in response to determining one or more of a vehicle occupant position, a vehicle occupant orientation, a vehicle seat position, a vehicle seat orientation, a vehicle seat reclination (or tilt), or the like, computer 14 may perform one or more of the following vehicle functions such as adjusting vehicle seat belts, operating load limiters associated with the seat belt assembly, deploying other vehicle airbags not shown or described above, moving or operating other accessories or vehicle structures not explicitly shown and described above.

Further, vehicle restraint modules described herein may comprise reversible or non-reversible airbags. For example, non-reversible airbags have two states: deployed and undeployed. However, reversible airbags further include an intermediate state which can be reversed-computer 14 may actuate such modules to the intermediate state based on vehicle sensor data—e.g., based on vehicle acceleration per various axes, based on braking data, etc. Thus, in at least one example, performing a vehicle function also can include actuating the airbag to this intermediate state, and/or returning the airbag to its previous undeployed state. Reversible and non-reversible airbags are known in the art and thus will not be discussed further here.

Thus, there has been described a cabin monitoring system for a vehicle. The system includes a computer that is programmed to receive image data from a sensor suite that scans a vehicle cabin and then generate image data or model(s) therefrom. Based on circumstances involving the occupant(s) within the cabin, the computer further is programmed to perform at least one vehicle function.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising a processor and memory storing instructions to perform steps executable by the processor, the steps comprising:
   receiving image data that includes a vehicle seat and an occupant within a vehicle cabin;
   determining, using the received image data, an orientation of the vehicle seat and an orientation of the occupant; and
   based on the determination, performing a vehicle function that includes translating, reclining, or rotating the vehicle seat, or a combination thereof.

2. The computer of claim 1, wherein the image data is received from a sensor mounted within the vehicle cabin.

3. The computer of claim 1, wherein the image data is received from at least one light detection and ranging device.

4. The computer of claim 1, wherein the steps further comprise: using the received image data, determine a position of the vehicle seat, and then perform the function at least partially based on the position of the vehicle seat.

5. The computer of claim 1, wherein the function includes inhibiting deployment of an airbag from a vehicle restraint module.

6. The computer of claim 5, wherein inhibiting deployment is based on the orientation of the occupant relative to the vehicle seat.

7. The computer of claim 1, wherein the function includes aligning an axis of the vehicle seat with a primary direction of force (PDOF) of a predicted collision event.

8. The computer of claim 1, wherein the function includes controlling a directionality of an air vent or an audio speaker in the vehicle cabin.

9. A computer, comprising a processor and memory storing instructions to perform steps executable by the processor, the steps comprising:
  determining, using image data, an orientation of a vehicle occupant relative to a vehicle seat;
  determining an imminent collision event; and
  controlling movement of the vehicle seat based on the determinations.

10. The computer of claim 9, wherein the data is received from at least one light detection and ranging device located within a vehicle cabin.

11. The computer of claim 9, wherein the steps further comprise: based on the determinations, inhibiting deployment of an airbag from a vehicle restraint module in response to the imminent collision event.

12. The computer of claim 9, wherein the movement includes translating, reclining, or rotating the vehicle seat, or a combination thereof.

13. A method, comprising:
  receiving image data that includes a vehicle seat and an occupant within a vehicle cabin;
  determining, using the received image data, an orientation of the vehicle seat and an orientation of the occupant; and
  based on the determination, performing a vehicle function that includes translating, reclining, or rotating the vehicle seat, or a combination thereof.

14. The method of claim 13, wherein the image data is received from a sensor mounted within the vehicle cabin, wherein the image data is received from at least one light detection and ranging device.

15. The method of claim 13, further comprising: using the received image data, determining a position of the vehicle seat, and then performing the function at least partially based on the position of the vehicle seat.

16. The method of claim 13, wherein, in response to a collision event, the function includes inhibiting deployment of a vehicle restraint module that includes an airbag.

17. The method of claim 16, wherein inhibiting deployment is based on the orientation of the occupant relative to the vehicle seat.

18. The method of claim 13, wherein the function includes aligning an axis of the vehicle seat with a primary direction of force (PDOF) of a predicted collision event.

* * * * *